March 17, 1970    H. F. SHERWOOD    3,501,636
ENHANCING RADIATION DAMAGE FOR NUCLEAR PARTICLE DETECTION
Filed Nov. 9, 1966
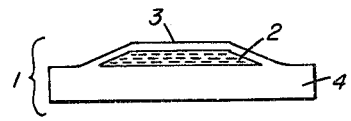
FIG. 1
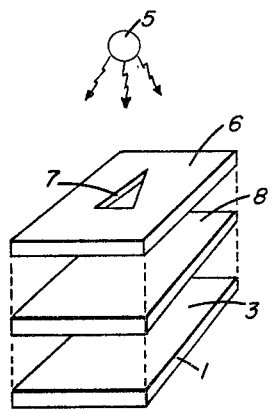
FIG. 2A
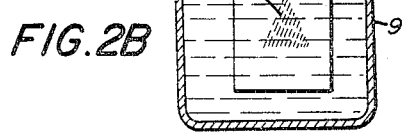
FIG. 2B
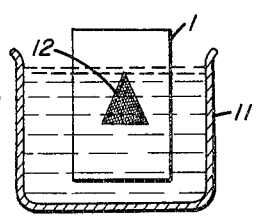
FIG. 2C
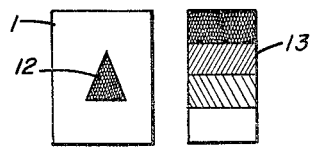
FIG. 2D
HAROLD F. SHERWOOD
INVENTOR.
BY
ATTORNEY

United States Patent Office 3,501,636
Patented Mar. 17, 1970

3,501,636
ENHANCING RADIATION DAMAGE FOR
NUCLEAR PARTICLE DETECTION
Harold Frank Sherwood, Rochester, N.Y., assignor to
Eastman Kodak Company, Rochester, N.Y., a corporation of New Jersey
Filed Nov. 9, 1966, Ser. No. 593,044
Int. Cl. G01t 1/16; H01j 39/00
U.S. Cl. 250—83
24 Claims

ABSTRACT OF THE DISCLOSURE

Method and apparatus are disclosed for monitoring and recording damage created by nuclear particles in a radiation-damageable overcoat material placed adjacent a sensitive layer of material which is capable of a color-change when contacted by certain modifiers. The overcoat is subjected to nuclear particle bombardment and then etched to enlarge paths created by those particles passing through the overcoat. A modifier is then applied to the overcoated material, passing through the etched paths of the overcoat to effect a color-change in the exposed areas of the sensitive material, thereby providing a high-contrast image of the radiation-damage caused by the particles.

---

This invention relates to radiation monitoring, to radiation image recording and, more particularly, to solid-state nuclear detectors.

The novel method and solid-state nuclear particle detector disclosed herein optically enhances radiation-damage occurring in certain solid materials as the result of nuclear particle bombardment by providing substantial color contrast between damaged and undamaged areas. Further, the invention also provides a high contrast photographic record of such radiation-damage without requiring darkroom preparation or handling of any of the materials.

In recent years, it has been learned that certain homogeneous, electrically insulating solids, when subjected to bombardment by nuclear particles, are damaged by the ionizing effect of the particles. It is also known that this radiation damage can be made visible by etching the solid in a reagent which attacks those portions of the solid whose structure and chemical reactivity have been altered as a result of the ionizing effect of the particles. The etching produces fine channels in the solid which accurately indicate the trajectories of the particles. If the solid is transparent, the etched channels appear as cuts ("tracks") when the solid is viewed by transmitted light. (See R. L. Fleischer et al., "Track Registration in Various Solid-State Nuclear Track Detectors" Physical Review, vol. 133, No. 5A, Mar. 2, 1964 at page A–1443.) However, these prior art solid-state track detectors have not provided sufficient contrast between the damaged and undamaged areas to permit simple visual evaluation of the nature and extent of the radiation-damage.

The invention herein improves such solid-state track detectors by providing a very simple and economic method whereby the radiation-damage caused by nuclear particle bombardment may be greatly enhanced for purposes of visual evaluation and by providing a detector which produces a high contrast image of the radiation-damaged portions of the solid.

According to one embodiment of the invention herein plastic, or other homogeneous solids susceptible to radiation-damage, is combined with a colorant which is diffused evenly throughout it. After being subjected to bombardment by the nuclear particles to be detected, the colored plastic is contacted by a modifying agent, namely, an etchant, to form fine channels in the plastic delineating its radiation-damaged areas, as referred to above. Thereafter, when the colored plastic is viewed by transmitted or reflected light, the damaged portions appear as substantially contrasting colored areas varying in hue as a function of the intensity of the radiation-damage.

According to other embodiments of the invention herein, the radiation-damageable plastic or other solid is applied as an overcoat to a layer of material in which substantial color change occurs when contacted by certain modifiers. Examples of such materials are developable photosensitive emulsions, gelatins which readily accept particular dyes, and dyestuffs which can be readily bleached. The plastic overcoat is insensitive to the modifier, i.e., to the developer, if a photosensitive layer is used, or to the dye or bleach used to cause color change in the layer. The overcoat is subjected to bombardment by nuclear particles to be detected. An etchant is then applied to the overcoat to form fine channels delineating its radiation-damaged areas. As a result of the etching, the overcoat is removed or thinned sufficiently beneath each of the etched channels to allow the modifier to reach the color-change layer. Thereafter, the coated layer is contacted with the modifier, which reaches and substantially alters the color of only those portions of the layer lying beneath the etched, radiation-damaged portions of the overcoat, thereby providing a high-contrast image of the "tracks" made in the overcoat as a result of the nuclear particle bombardment.

Therefore, it is an object of the invention herein to provide a method and means by which radiation-damage can be evaluated visually more easily than by methods currently in use.

Another object is to provide a high-contrast image of the radiation-damaged areas of selected materials.

A further object is to provide a solid-state nuclear particle track detector in which radiation-damage may be recorded photographically and which can be prepared, exposed to radiation, and developed in white light.

Still another object of this invention is to provide a simple, economical method of detecting and recording only alpha or other radiations of higher specific ionization, even though such detection and recording occurs in the presence of infrared, light, ultraviolet, beta, X, and gamma radiations.

These and other objects of the invention herein will be more fully understood from the following detailed description and the accompanying drawings in which:

FIG. 1 illustrates, in schematic cross-section, a solid-state nuclear particle detector in accordance with the invention herein, and FIGS. 2a through 2d illustrate schematically the novel method by which the detector illustrated in FIG. 1 may be used as a neutron dosimeter.

As noted above, the invention may be practiced by using a variety of color-change materials. However, the following detailed description of the novel detector and method will be limited to a preferred embodiment in which the detector includes a color-change layer comprising a photographic emulsion, and in which the corresponding modifier is a photographic developing solution.

Referring now to FIG. 1, the nuclear particle track detector 1, shown in schematic cross-section, comprises a color-change layer 2 comprising a photosensitive emulsion covered by a thin overcoat 3 of cellulose nitrate, a homogeneous solid which is susceptible to radiation-damage when bombarded by nuclear particles having relatively high specific ionization, namely, by alpha particles and fission fragments. In addition, overcoat 3 is impervious or insensitive to modifiers normally used to color or bleach layer 2, and so, in the preferred embodiment, overcoat 3 is impervious to photographic developers. While the invention is preferably practiced by applying overcoat 3 to the emulsion surface of commercially available silver halide photographic film, color-change layer 2 may be carried by any suitable support 4 which may comprise the same material used for overcoat 3.

It is known that radiation-damage occurs in many homogeneous, electrically insulating solids, such as, glasses, materials having various crystalline structures (ionic crystals, covalent crystals, layer-structure crystals), and plastics. Plastics such as cellulose nitrate, cellulose acetate, and cellulose acetate butyrate are all satisfactory for the overcoat disclosed herein, but the preferred material for the overcoat is cellulose nitrate.

The radiation detector disclosed in FIG. 1 provides optical amplification of radiation-damaged images by providing an enhanced color contrast image spatially correlated with the damaged areas. This can best be understood by reference to FIGS. 2a through 2d in which it is assumed that detector 1 is being used as a neutron dosimeter. Referring first to FIG. 2a, it is assumed that detector 1 is monitoring radiation from neutron source 5. As shown in exploded fashion, for this purpose detector 1 is covered by an appropriate shield 6 having a triangular aperture 7 and by a converting layer 8 (e.g., enriched uranium foil) which is placed in intimate contact with overcoat 3. Neutrons radiating from source 5 pass through aperture 7 of shield 6, striking converting layer 8. The interaction of the neutrons with the converting layer produces fission, as is well known in the art, resulting in the emission of alpha particles and fission fragments. As these nuclear particles and fragments move through overcoat 3, they cause radiation-damage, changing the structure and chemical reactivity of the overcoat material in the damaged areas.

When the time period for monitoring source 5 has elapsed, shield 6 and converting layer 8 are removed from detector 1 and, as illustrated in FIG. 2b, the detector is placed in a suitable etchant 9 which attacks primarily the radiation-damaged regions 10 of the overcoat material. A suitable etchant is sodium hydroxide, but the normality or the specific type of alkali is not critical. It is only necessary that the etching solution selected be sufficiently strong to remove or substantially thin the radiation-damaged regions 10 of the overcoat material.

The steps referred to above are taken in normal ambient light, and the photosensitive emulsion comprising layer 2 is fully exposed. As shown in FIG. 2c, after etching, detector 1 is contacted with a modifier (photographic developer) 11 for the purpose of developing a color change in the portions of layer 2 lying beneath the etched radiation-damaged regions 10 of overcoat 3.

As a result of this color-change development, the radiation-damaged portions of overcoat 3 becomes readily visible as, in the preferred embodiment, a corresponding photographic image 12 on photosensitive emulsion layer 2. Where only a few events are being monitored, developed layer 2 of detector 1 may be viewed microscopically, or, as illustrated in FIG. 2d, when detector 1 is used as a dosimeter, the color density of the developed regions 12 of photosensitive layer 2 may be compared with a sensitometric time-scale 13 having a plurality of step tones indicative of predetermined amounts of exposure to radiation similar to that being monitored, as is well known in the art.

Detector 1 will record only those alpha particles and fission fragments which have penetrated the overcoat sufficiently to produce damage such that etching will allow the modifier to reach the color-change layer. Therefore, it is essential that the thickness of the overcoat not be greatly in excess of the expected range of the ionizing particles. This can be determined from practical tests in which the selected overcoat material is bombarded by the type of particles which are to be detected.

For monitoring alpha particles, it has been determined that the thickness of a cellulose nitrate overcoat should be between about 3 to about 8 microns. If the coating is thinner, pinholes may occur in the coating resulting in unwanted development of the color-change layer in background areas. If the overcoat is too much greater than the penetrating range of the particles to be detected, the time required for the etchant to penetrate through the damaged regions to the color-change layer becomes excessive and "track" resolution is lost.

While it should be understood that many different types of developable photosensitive emulsions might be used for the color-change layer (e.g., light sensitive polymers, or those used in diazo systems, vesicular bubble film systems, etc.), only silver halide emulsions have been used in the examples herein. In this regard, almost any emulsion with a medium or fine grain size is satisfactory. However, it has been found that if the grain size of the silver halide emulsion approaches that of Kodak Blue Brand Medical X-Ray Film, an uneven coating of the cellulose nitrate results, causing the formation of pinholes and unwanted development of background areas.

Also, photosensitive emulsions including an incorporated developer, as well known in the photographic art, may be used for the color-change layer with good results. (Useful incorporated developing agents include the 4-phenyl-catechols, Phenidones, p-phenylenediamines, and Elon-hydroquinones.) Such incorporated developers are activated by the alkali when it has etched its way through the overcoat.

Special attention is called to the fact that the modifier may be incorporated in the etching bath if so desired. This has the definite advantage of reducing the number of solutions and also permits the operator to control the extent of the etching by noting the development that occurs. When using a silver halide layer, a solution of one part developer to four parts etchant is satisfactory. However, the amount of developer does not appear to be critical so long as it is sufficient to develop all of the silver halide present in the etched area in a reasonably short period of time.

Although silver halide is normally developed at room temperatures, the developing solution will operate satisfactorily when combined with an etchant solution at about 140° F. The temperature is not critical so long as it is not sufficiently high to cause the photographic emulsion to melt off of its support. In this regard, however, hardening the photographic emulsion not only helps the emulsion withstand the relatively high temperatures of processing, but it also improves image quality by reducing migration of the developing agent during development, thus reducing image spread and increasing the resolution of the detector where only a relatively few tracks have been recorded. Hardening of the photosensitive layer should be carried out prior to overcoating. This can be accomplished either during the actual preparation of the emulsion or by applying a hardening agent in solution to the emulsion after it has been coated on its support, as is well known in the photographic art.

Of course, to obtain a permanent photographic record of the radiation-damage, the overcoat should be completely removed from the photosensitive layer, and the image and its background should be fixed in accordance with the photographic system being used. This is also necessary in the event that a reversed image of the damage is to be prepared from the originally developed layer. When a permanent photographic record is desired, soaking the detector in water for an extended period of time at room temperature will loosen the bond between the emulsion surface and the preferred cellulose nitrate overcoat, thus permitting the nitrate to be slipped off.

As noted above, the detailed description of the invention has been limited to a method and detector having a silver halide photographic emulsion as the color-change layer, but it should be apparent that this description can be easily applied to other forms of the invention in which the detector uses a dyed plastic overcoat (see Example 8) or includes a color-change layer of a different material. Of course, with such a different color-change layer, a corresponding modifier must be used to develop the layer. For instance, where the color-change material is gelatin or a plastic which readily accepts a particular dye, the appropriate modifier is such a dye and is applied to the detector following or during the etching step. (See Example 6.) Or the color-change layer may comprise a photoconductive material with xerographic toner serving as the modifier. (See Example 10.) If the color-change layer is already colored (e.g., as dyed gelatin or developed silver halide emulsion), the color-modifying bleach or silver reducer is similarly applied following or during the etching step. (Eee Example 5.) Also, similar to the silver halide emulsion with incorporated developer referred to above, the color-change layer may comprise a colorless dye former which combines with a reactant modifier to produce a substantially contrasting color change in the etched areas. (See Examples 7 and 9.)

Attention is also called to the fact that the material used for the overcoat will determine to some extent the type of particles which will be detected, permitting particle detection to be somewhat selective. For instance, only particles having a specific ionization as high as alpha particles will produce radiation-damage in cellulose nitrate. Therefore, a detector using cellulose nitrate as an overcoat will be virtually insensitive to ultraviolet, light, infrared, beta, X and gamma radiations and will selectively record the presence of alpha particles or fission fragments even though the other radiations are present.

The invention will be further illustrated by reference to the following specific examples:

EXAMPLE 1

A layer of cellulose nitrate (nitro cellulose and amyl acetate, 10% concentration from Ernst F. Fullam, Inc., Schenectady, N.Y.) was coated over a piece of Kodak Spectroscopic Film, Type 649, in ambient light to form a cellulose nitrate "skin" over the entire surface of the photographic emulsion. The coated plate was then dried and exposed to a source of alpha particles for approximately three minutes. The plate was then etched for five minutes in a solution of 6.5 N sodium hydroxide at a temperature of about 140° F., and thereafter dipped in Kodak D-8 Developer solution (1:1) at room temperature for two minutes and subsequently fixed, washed and dried. A silver image of high contrast was formed in the radiation-damaged areas. The dry thickness of the silver halide emulsion was found to be about 1 micron. Measurements indicate that the dry thickness of the cellulose nitrate was about 4 microns.

EXAMPLE 2

Example 1 was repeated except that a piece of cellulose nitrate film base was dissolved in iso-pentyl acetate (T-298, MW 130.19) to obtain about a 5% concentration. This was coated on the photographic silver halide film at about twice the wet thickness as in Example 1 to obtain about the same dry thickness. Upon testing, the results appear to be the same as those of Example 1.

EXAMPLE 3

A piece of Kodak Spectroscopic Film, Type 649, was immersed in a 40% formaldehyde solution for twenty minutes, washed for one minute and dried in room air. The coating of the cellulose nitrate and the testing of the film was repeated exactly as in Example 1. The result showed that there was definitely less swelling than in Example 1 of the developed regions beneath the etched areas of the cellulose nitrate overcoat.

EXAMPLE 4

A piece of coated film as in Example 1 was exposed to a source of alpha particles in a series of exposures to yield a step-wedge sensitometric exposure/time scale. Each step was produced by increasing exposure by a factor of two, namely, ½, 1, 2, 4, and 8 minutes. The result, after processing as in Example 1, was an image varying in density from light to dark in well defined steps.

EXAMPLE 5

A layer of cellulose nitrate of the type described in Example 1 was coated over a piece of Kodak Spectroscopic Film, Type 649 which had been totally exposed and developed in Kodak D-8 Developer solution (1:1) for five minutes and subsequently washed and dried. The sample of the developed spectroscopic film with the cellulose nitrate skin was exposed to a source of alpha particles through holes in a metal plate. The sample was then etched for five minutes in a solution of 6.5 N sodium hydroxide at a temperature of about 140° F., dipped in water, and placed in Kodak R-9 bleach bath at room temperature for five minutes. The sample was then removed from the bleach bath, washed for two minutes, and dried. Where the cellulose nitrate had been damaged by radiation and removed by the etchant, the bleach removed the metallic silver, leaving clear dot areas. The result was a reversal, or positive type, image.

EXAMPLE 6

A piece of 4" x 35 mm. cinepositive type film was put in a Kodak F-5 fix bath for ten minutes, washed and dried, to obtain a piece of film with essentially clear gelatin layer on it. Over the gel layer was coated a thin (0.5 mil) layer of cellulose nitrate ("skin") which completely covered the surface of the gelatin layer. After drying, the sample was exposed to a source of alpha particles modulated spatially by holes in a metal plate. After etching the sample for five minutes in the 6.5 N sodium hydroxide solution at around 140° F., the sample was dipped into a 5% aqueous solution of Acryidine Orange. The sample was then removed from the dye solution, washed for two minutes in water, and dried. The result was a regular negative type image formed by the dye which imbibed into the areas of the sample where radiation-damage had exposed the gelatin layer.

EXAMPLE 7

A layer of cellulose nitrate, prepared from the solution used in Example 1, was coated over a photoexposed layer of medium speed silver bromoiodide photographic emulsions containing 150 mg. of silver/ft.$^2$ and 70 mg./ft.$^2$ of 1-(2,4,6-trichlorophenyl)-3-[3-(2,4-diamylphenoxy acetoamido)benzamido]-5-pyrazolone. The coated sample was then dried and exposed imagewise to a source of alpha particles for approximately three minutes. The sample was then etched for five minutes in a solution of 6.5 N sodium hydroxide at a temperature of about 140° F., then dipped into an alkaline solution containing ten grams of 4-N,N-diethylaminoaniline for ten minutes at 68° F. The sample was then washed and dried. The result was a magenta colored dye image formed in the radiation-damaged areas of the photographic material. The pyrazolone, which is a dye former, and the aniline developing agent are both compounds well known in the color photography art.

EXAMPLE 8

A four inch x 35 mm., five mil thick sample of polyethylene terephthalate film support was coated on one side with a 10% cellulose nitrate solution containing as an additional addenda at 1% concentration [4,8-di(p-triglycolylanilino)anthrarufin], and dried. The sample was then exposed to a source of alpha particles for approximately three minutes. The sample was then etched for five minutes in a solution of 6.5 N sodium hydroxide solution at a temperature of about 140° F. The result in the areas of heaviest radiation, showed clear damage areas against a brilliant blue background. Around the edges of the sample, where the exposure had been lighter, the etching out of the radiation-damaged areas was not as great, providing variable hues of blue dye, the hues of each area depending on the exposure the sample received, varying as a function of its relative exposure to radiation.

EXAMPLE 9

A layer of photographic gelatin, 20 mils thickness, containing a 1% solution of phenolphthalein indicator at a pH of approximately 4.25 was coated on a 5 mil polyethylene terephthalate film support and dried. A layer of cellulose nitrate skin was coated as described in Example 1 on the gel layer and dried. The coated sample was exposed as in Example 5 to a source of alpha particles for approximately three minutes and etched for five minutes in a solution of 6.5 N sodium hydroxide at a temperature of about 140° F. The sample was then washed and dried. The result was the pink coloration of the phenolphthalein indicator dye normally seen when it is put in a dilute alkaline medium. The dye formed a negative type image of the radiation-damage occurring in the cellulose nitrate overcoat.

EXAMPLE 10

On a 2" x 2" sample of electrically conducting Nesa glass was coated a 4 mil dry thickness layer of triphenyl amine (a photoconductor) in a gelatin binder wherein the photoconductor to binder ratio is about .3:1. Over this was coated a layer of 10% cellulose nitrate solution as described in Example 1 and dried. This sample was exposed to a source of alpha particles for approximately three minutes. The sample was then etched for five minutes in a solution of 6.5 N sodium hydroxide at a temperature of about 140° F., washed and dried. The sample was then charged, toned, and fused by well known xerographic techniques. The toner particles were fused in the radiation-damaged areas of the cellulose nitrate skin giving a neutral black image of the radiation-damaged portions of the cellulose nitrate overcoat.

The invention has been described in detail with particular reference to preferred embodiments of the novel detector and method disclosed herein, but it should be understood that variations and modifications can be effected within the spirit and scope of the invention as defined in the appended claims.

I claim:

1. A nuclear particles detector comprising material susceptible to radiation-damage by nuclear particles, and color-change means responsive to a modifier for enhancing color contrast between radiation-damaged portions and undamaged portions of said material.

2. The detector according to claim 1 wherein said color-change means comprises a colorant diffused throughout said material, and wherein said modifier comprises an etchant.

3. The detector according to claim 1 wherein said material is insensitive to said modifier, and wherein said color-change means comprises a layer overcoated by said material and susceptible to substantial color change when contacted by said modifier.

4. The detector according to claim 2 wherein said material is cellulose nitrate and said colorant is blue dye.

5. The detector according to claim 3 wherein said layer is photoconductive and said modifier is a xerographic toner.

6. A nuclear particle detector comprising a color-change layer susceptible to substantially contrasting color change when contacted by a modifier, and an overcoat insensitive to said modifier, said overcoat being susceptible to radiation-damage by nuclear particles.

7. A detector according to claim 6 wherein said layer comprises a developable photosensitive emulsion.

8. A detector according to claim 6 wherein said layer comprises a bleachable colorant.

9. A detector according to claim 6 wherein said layer readily accepts a predetermined dye and said modifier comprises said dye.

10. A detector according to claim 6 wherein said layer comprises a dye former and said modifier comprises a corresponding reactant for said dye former.

11. A detector according to claim 6 wherein said overcoat is selected from the group of homogeneous, electrically insulating solids consisting of ionic crystals, covalent crystals, layer-structure crystals, glasses and plastics.

12. A detector according to claim 6 wherein the thickness of said overcoat is selected as a function of the depth of such radiation-damage expected from nuclear particles of the type to be detected.

13. A detector according to claim 7 wherein said emulsion comprises a silver halide photographic emulsion.

14. A detector according to claim 7 wherein said emulsion includes an incorporated developer.

15. A detector according to claim 8 wherein said layer comprises a developed silver emulsion and said modifier comprises a silver-reducing bleach.

16. A detector according to claim 9 wherein said layer comprises gelatin and said dye comprises Acryidine Orange.

17. A detector according to claim 10 wherein said dye former comprises pyrazalone and said reactant comprises an aniline developing agent.

18. A detector according to claim 11 wherein said homogeneous solid is cellulose nitrate.

19. A detector according to claim 12 wherein the thickness of said overcoat is substantially between 3 to 8 microns.

20. A detector according to claim 13 wherein said emulsion is hardened.

21. The method of detecting nuclear particle tracks comprising applying an overcoat to a layer of material susceptible to substantially contrasting color change when contacted by a modifier, said overcoat being insensitive to said modifier and susceptible to radiation-damage by nuclear particles; exposing said coated layer to bombardment by nuclear particles; etching said coated layer until the radiation-damaged portions of said overcoat are etched substantially through to said layer; and developing, by contact with said modifier, a substantially contrasting color change in those portions of the layer exposed by said etching to produce a high contrast image of the radiation-damage tracks formed in the overcoat by said nuclear particles.

22. The method according to claim 21 wherein said etching and developing steps are combined by contacting said bombarded overcoated layer with a solution containing a combination of etchant and modifier.

23. The method of enhancing the visibility of radiation-damage occurring in a material applied as an overcoat to a layer susceptible to substantially contrasting color change when contacted by a modifier, said overcoat material being insensitive to said modifier, comprising the steps of etching said overcoated layer until said radiation-damaged portions of the overcoat are etched substantially through to the layer, and developing, by contact with said modifier, those portions of the layer exposed by said etching to obtain an enhanced, high contrast image of said radiation-damage.

24. The method according to claim 23 wherein said etching and developing steps are combiner by contacting said radiation-damaged overcoated layer with a solution containing a combination of etchant and modifier.

References Cited

UNITED STATES PATENTS 3,335,278   8/1967   Price et al.
3,373,683   3/1968   Alter.

OTHER REFERENCES

Fleischer et al., "Tracks of Charged Particles in Solids," Science, July 23, 1965, vol. 149, No. 3682.

ARCHIE R. BORCHELT, Primary Examiner

MORTON J. FROME, Assistant Examiner